United States Patent [19]

Lucht

[11] 4,217,850
[45] Aug. 19, 1980

[54] APPARATUS FOR FLAMESCARFING

[75] Inventor: Alfred Lucht, Bickenbach, Fed. Rep. of Germany

[73] Assignee: Messer Griesheim GmbH, Frankfurt am Main, Fed. Rep. of Germany

[21] Appl. No.: 923,677

[22] Filed: Jul. 11, 1978

[30] Foreign Application Priority Data

Jul. 23, 1977 [DE] Fed. Rep. of Germany ....... 2733325

[51] Int. Cl.$^2$ .................. B05C 11/00; B05C 13/00; B23K 7/06; B23K 26/00
[52] U.S. Cl. .................................. 118/47; 118/58; 118/68; 148/9.5; 266/51
[58] Field of Search .......................... 118/47, 58, 68; 148/9.5; 266/51

[56] References Cited

U.S. PATENT DOCUMENTS

| 2,451,422 | 10/1948 | Wagner | 266/51 |
| 2,754,234 | 7/1956 | Holub et al. | 148/9.5 |
| 2,998,322 | 8/1961 | Strate | 118/47 |
| 3,033,133 | 5/1962 | Kelley et al. | 266/51 |
| 3,096,199 | 7/1963 | Lamb | 118/47 |
| 3,135,626 | 6/1964 | Moen et al. | 118/47 |
| 3,639,178 | 2/1972 | Birr et al. | 266/51 |

Primary Examiner—Richard C. Schilling
Attorney, Agent, or Firm—Connolly and Hutz

[57] ABSTRACT

An apparatus for flamescarfing the surface of a workpiece includes a powder supply device having a powder container connected via a shut-off valve to a powder distributor which is connected via hoses with nozzles mounted on the flamescarfing burner.

10 Claims, 5 Drawing Figures

APPARATUS FOR FLAMESCARFING

BACKGROUND OF THE INVENTION

The present invention relates to an apparatus for flamescarfing the surface of a workpiece with at least one flamescarfing burner as well as with a powder supply device connected to the flamescarfing burner.

It is necessary with the thus far conventionally used flamescarfing processes to heat the workpiece by means of preheating flames and, to be sure, until the ignition temperature of the metal has been reached. Only then, the actual flamescarfing process can be started.

Since preheating requires a certain amount of time, it was already proposed to reduce this preheating time by placing an electrode at the flamescarfing burner which is ignited electrically and then forms a locally defined ignition spot in the flamescarfing zone in front of the flamescarfing burner, which is then used as an auxiliary starter for the beginning flamescarfing process (compare this with U.S. Pat. No. 2,513,425).

It was, furthermore, proposed to use iron dust to accelerate the preheating process, which is supplied to the preheating flames via nozzles mounted on the flamescarfing burner. See for this state of the art German Patent DT-PS No. 2,251,788.

SUMMARY OF THE INVENTION

It is an object of the present invention to provide a powder supply device in an apparatus for flamescarfing the surface of a workpiece which is simple in its construction design.

To meet the above mentioned object, it is proposed according to the invention that the powder supply device has a powder container, connected to a powder distributor via a shut-off valve placed between them and which is connected via pipelines or hoses to nozzles mounted on the flamescarfing burner.

An essential component of the powder supply device is a powder distributor which has according to the invention a distributor chamber connected to a supply pipe, and is provided which discharge nipples.

A specicic advantage is present when the distributor chamber consists of holes drilled at an angle, the axes of which meet the longitudinal axis of the supply pipe in a common point.

This specific construction of the powder distributor, especially its distributor chamber, guarantees that the powder introduced into the chamber via the supply pipe is uniformly distributed by the cone so that each discharge nipple is supplied with the same amount of powder.

This uniform powder charge for the discharge nipples is, according to an additional proposal of the invention, further supported in that the discharge nipples are arranged concentrically to the distributor chamber. The delivery of the powder from the powder distributor to the nozzles mounted on the flamecoating butner takes place by means of compressed air. It was further proposed in this respect, according to the invention, that the supply pipe is surrounded by an annular chamber which is provided with an air intake nipple and that this annular chamber is connected with the discharge nipples via injectors.

In a preferred embodiment of the invention an annular slot which forms the connection between distributor chamber and discharge nipple is provided between injector and the drilled hole which contains the discharge nipple.

In order to prevent that a powder residue deposit remains in the distributor chamber as a result of an interruption in the powder supply, it is further provided according to the invention that the angle of the cone is greater than the angle of repose of the powder to be conveyed. It is ascertained in this way that during an interruption in the powder supply, the distributor chamber empties completely and no powder residue remains behind. This is especially necessary during longer interruptions, since the powder remaining behind inevitably "cakes together" as a result of air humidity and these powder plugs cannot be driven out any more by the propelling air so that a time consuming cleaning becomes necessary.

THE DRAWINGS

DETAILED DESCRIPTION

Figure 1:
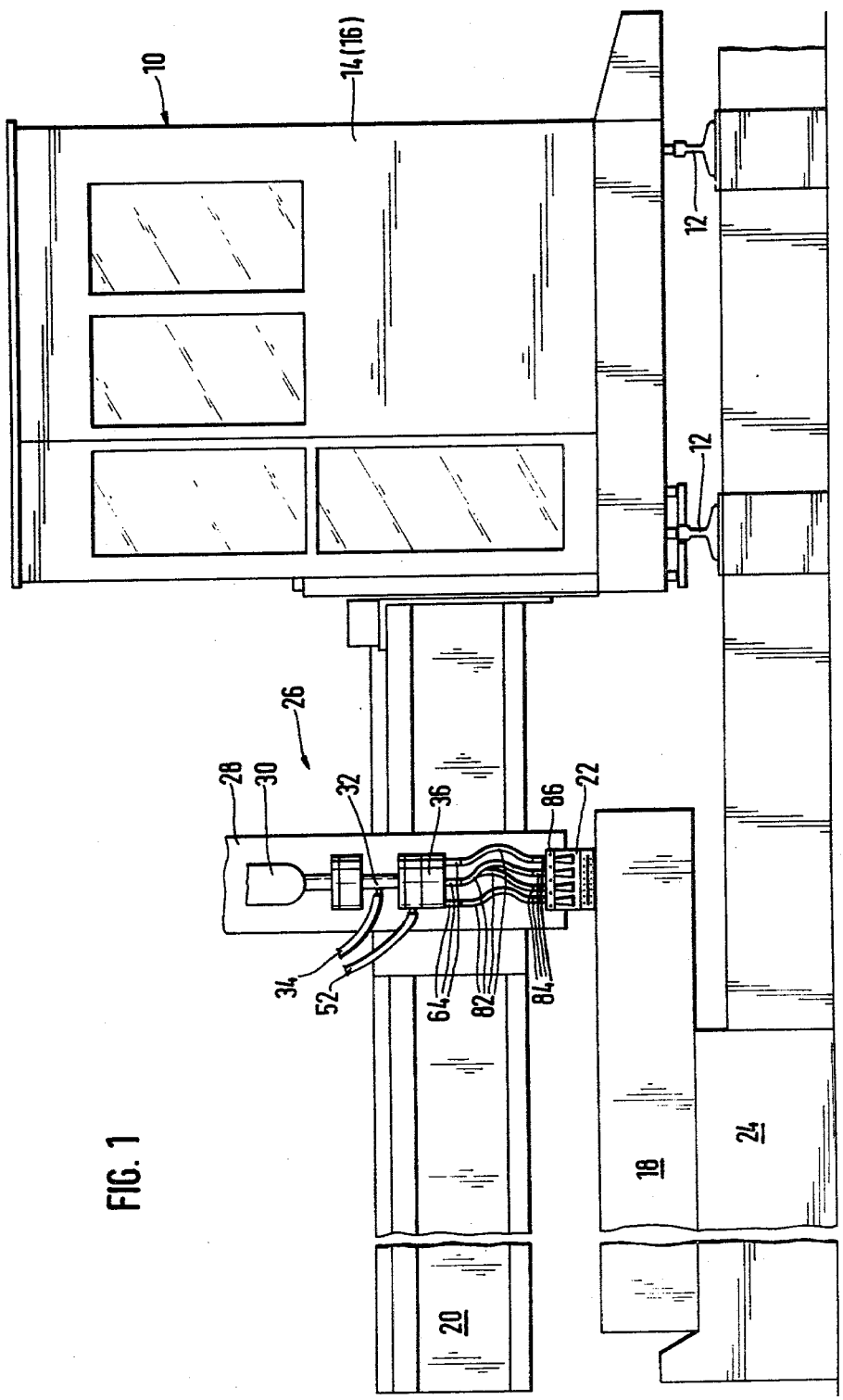
FIG. 1 shows a simplified elevation view of a flamescarfing machine including the powder supply device according to the invention.

As can be seen from FIG. 1, the flamescarfing apparatus 10 consists of a machine carriage 14 which can traverse on tracks 12, provided with a control console 16. A cantilevered arm 20 is installed on the machine carriage 14 projecting over the workpiece 18 to be flamescarfed.

This cantilevered arm receives a flamescarfing burner 22 with which the workpiece 18 which rests on a base support 24 is to be flamescarfed.

FIG. 1 shows further that flamescarfing burner 22 is provided according to the invention with a powder supply device 26. This powder supply device is provided to the vertical carrier 28 which holds the flamescarfing burner 22 and can traverse back and forth to the cantilevered arm 20. A powder container 30 is installed at the upper end of the vertical carrier 28 in which the iron dust or another ignition accelerating powder is available.

A pinch valve 32 which is connected with a pressure medium source (not shown) via a pressure hose 34 is attached to the powder container 30. The pinch valve 32 is of a well-known construction and interrupts the flow path of the iron dust during pressure actuation resp. opens this flow path during pressure release.

A powder distributor which is shown in detail in FIGS. 2 to 5 connects to this pinch valve in flow direction.

The powder distributor 36 consists of a cylindrical two-part split housing, the two halves of which 38, 40 are fitted gas-tight together by means of bolts 42. A supply pipe 44 is centrally placed in the upper housing half 38 through which the powder flowing from the powder container 30 via the pinch valve 32 is introduced into the powder distributor 36. The supply pipe 44 closes flush with the bottom surface 46 of the housing half 38.

An annular chamber 48 through which the supply pipe 44 penetrates is provided in the upper housing half 38, which is connected with an air intake nipple 50. A compressed air hose 52 is connected to this air intake nipple 50, see FIG. 1, by means of which the compressed air needed for powder charge to the powder distributor 36 is supplied.

A distributor chamber 54 is provided in the lower housing half 40 which is enclosed by surface 46 of housing half 38 and the supply pipe 44. The distributor chamber 54 is penetrated (in the illustrated embodiment) by four injectors 62 which are held in a concentric circle and at the same distance from each other around the supply pipe 44 of the upper housing half 38. Each of these four injectors is connected with the annular chamber 48 and exits each time in a discharge nipple 64 which are held in drilled holes 66 in the lower housing half 40.

Injector 62 and discharge nipple 64 are mounted in such a relation to each other than an annular slot 68 is formed in their connecting area via which the iron dust available in distributor chamber 54 can flow into the discharge nipples 64. The distributor chamber 54 is formed by four holes 56 drilled at an angle, one of which is each time assigned to one of the discharge nipples 64. The axes 58 of the drilled holes 56 are inclined at an angle of 45° to the axes 70 of the discharge nipples 64 which can be seen in FIGS. 2 and 5. As a result of this inclined arrangement of the drilled holes 56, a steady flow of the iron dust available in the distributor chamber 54 into the discharge nipples 64 via the annular slot 68 is guaranteed. It is, of course, also possible to use a different drilling angle than 45°. It is decisive, however, that the selected drilling angle is always greater than the angle of repose of the powder used at the time.

The individual drilled hole surfaces 72 are separated from each other by a crest 74 which has such a sharp edge that powder cannot gather in this area but always flow on one of the adjacent drilled hole surfaces 72 to the appropriate discharge nipple 64.

Figure 4:
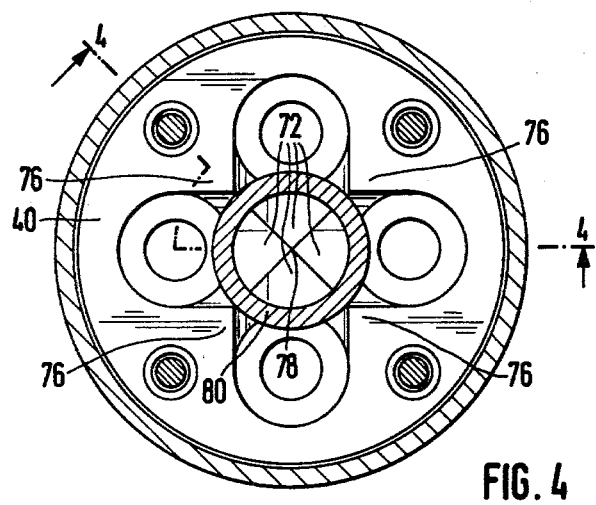
FIG. 4 is a cross-sectional view along line 3—3 in FIG. 2.
Figure 5:
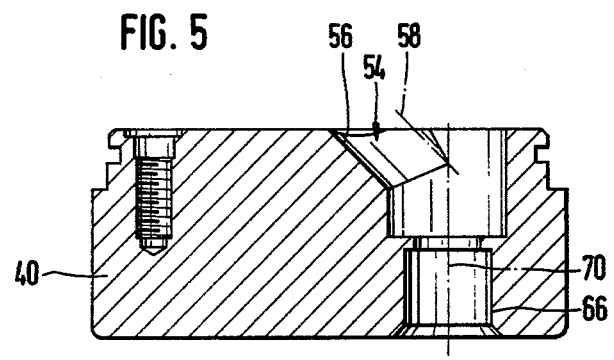
FIG. 5 is a cross-sectional view along line 4—4 in FIG. 4.

For technical-drilling reasons, see FIG. 4, there is a so-called gusset 76 between the individual holes 66 in which the discharge nipples 64 are held, on which possibly accumulating powder might remain behind. The axes 58 of the holes 56 are aligned with each other in such an advantageous way to prevent this that they intersect in a point 78 which simultaneously coincides with the longitudinal axis of the upply pipe 44, see FIG. 2. It is guaranteed in this way that the supply pipe 44 and the holes 56 which form the distributor chamber 54 are aligned centrally with each other. As determined by the diameter of the supply pipe 44 and its wall thickness, the gussets 76 are shielded by the front surface 80 resting on the crest 74 so that powder cannot reach these gussets. The front surface 80 is shown as a shaded area in FIG. 4.

Figure 2:
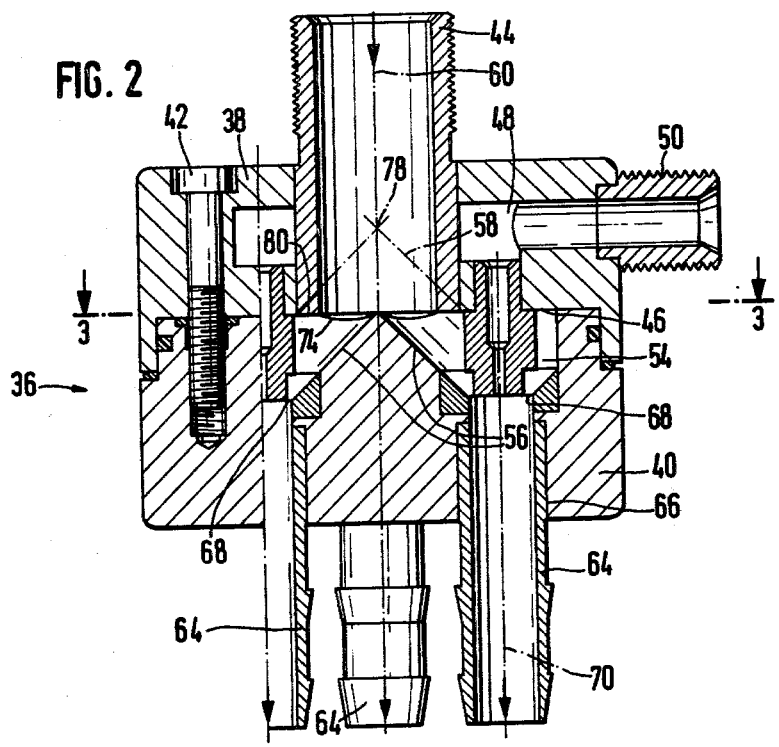
FIG. 2 is a cross-sectional view along line 2—2 in FIG. 3 of the powder distributor.
Figure 3:
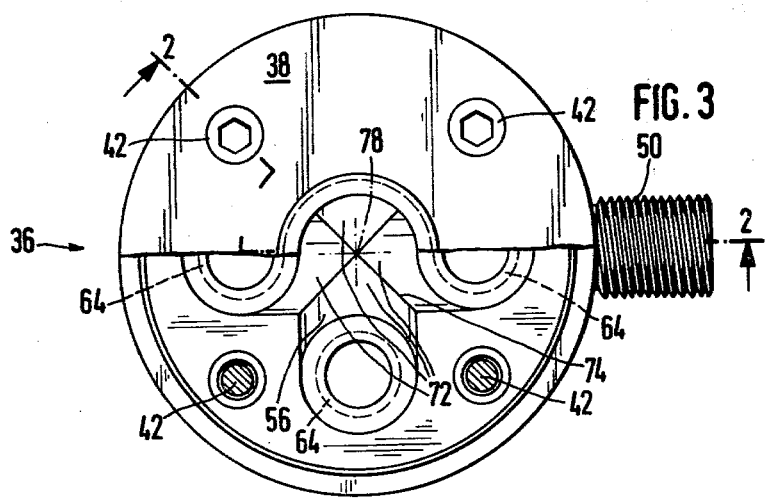
FIG. 3 is a plan view of FIG. 2.

The end of the discharge nipple 64 on the side of the housing widens out conically whereby this cone angle corresponds to the angle of the hole 56. As a result, as shown in FIG. 2, a continuous uniform transfer from the distributor chamber into the discharge nipples is guaranteed.

The angle of the hole 56 and, therefore, also the cone angle of the discharge nipple 64 is greater than the angle of repose of the powder to be conveyed so that as a result it is guaranteed that when the pinch valve 32 closes and there is, consequently, an interruption in the powder charge, the powder which remains behind in the distributor chamber flows out.

As can be seen as well from FIG. 1, hoses or pipelines 82 are connected to the discharge nipples 64 while on their other ends, facing the flamescarfing burner 22, a hozzle 84 is each time attached. These nozzles are adjustable in height by means of a holder 86 and mounted on the upper side of the flamescarfing burner 22. Depending on the requirements, the nozzles 84 can be pulled less or more from the holder 86 to vary the powder flow direction.

At the beginning of the preheating of the starting position of the workpiece to be flamescarfed, the pressure is released on the pinch valve 32 so that as a result the powder in the powder container 30 can flow into the powder distributor because of its own weight. The incoming powder is uniformly distributed through the holes 56, which are centrally arranged to the supply pipe 44, of the distributor chamber 54 and arrives in the area of the annular slot 68 of the discharge nipples 64. Simultaneously with opening the pinch valve 32, propelling air is also introduced into the annular chamber 48 via the air intake nipple 50 (operating pressure 3 bar) which flows from there into the discharge nipples 64 via the injectors 62.

The powder is pulled along from the distributor chamber 54 by this propelling air via the annular slot 68 and arrives in the form of a powder-air mixture via the pipelines 82 at the nozzles 84 at the flamecoating burner. The powder exiting from the nozzles is then introduced into the heating flame by a method known per se and acts then as an ignition accelerating auxiliary for the igniting process.

The powder supply device 26 according to the invention is easy to maintain and practically trouble-free. A nozzle 84 which becomes plugged as a result of slag buildup can be changed in minutes without the necessity of taking further action in the powder supply device. The constructive design of the powder distributor 36 guarantees a good uniform charge and distribution of the powder to the nozzles 84. Furthermore, it is also ascertained that no residual powder remains in the distributor during an interruption of the charging process which can be troublesome during a following charge or can even require a cleaning of the powder distributor.

The hoses or pipelines 82 provided between discharge nipples 64 and nozzles 84 are flexible and so long that even when the flamecoating burner 22 is swivelled around, an adequate powder flow to the nozzles 84 is guaranteed.

What is claimed is:

1. In an apparatus for scarfing the surface of a workpiece with at least one scarfing burner as well as with a powder supply device consisting of a powder container to which a powder distributor is connected, a shut-off valve between said container and said distributor, said distributor being connected via hoses with a powder nozzle associated with the scarfing burner, the improvement being a supply pipe leading from said container and having a plurality of discharge nipples communicating therewith, each of said discharge nipples being in communication with an injector, all of said injectors communicating with a common annular air chamber surrounding said supply pipe, and an air intake nipple leading to said annular air chamber.

2. An apparatus according to claim 1, characterized in that said powder distributor has a distributor chamber through which said discharge nipples are connected to said supply pipe.

3. An apparatus according to claim 2, characterized in that said distributor chamber consists of holes drilled at an angle, and the axes of said holes meeting with the longitudinal axis of said supply pipe in a common point.

4. An apparatus according to claim 2, characterized in that said discharge nipples are mounted concentrically to said distributor chamber.

5. An apparatus according to claim 1, characterized in that an annular slot is provided between said injectors and said discharge nipples which forms the connection between said distributor chamber and said discharge nipples.

6. An apparatus according to claim 3, characterized in that the angle of said drilled holes is greater than the angle of repose of the powder to be conveyed.

7. An apparatus according to claim 2, characterized in that each of said discharge nipples is provided with one of said powder nozzles.

8. An apparatus according to claim 3, characterized in that said supply pipe rests with its front surface on the crest bounding the drilled hole surfaces.

9. An apparatus according to claim 1, characterized in that said nozzles are adjustably mounted in a holder on said burner.

10. An apparatus according to claim 1 characterized in that a pinch valve is provided as said shut-off valve between said container and said distributor.

* * * * *